Nov. 5, 1929.　　　　W. C. GRAY　　　　1,734,427
FLEXIBLE DRIVE
Filed Jan. 3, 1927
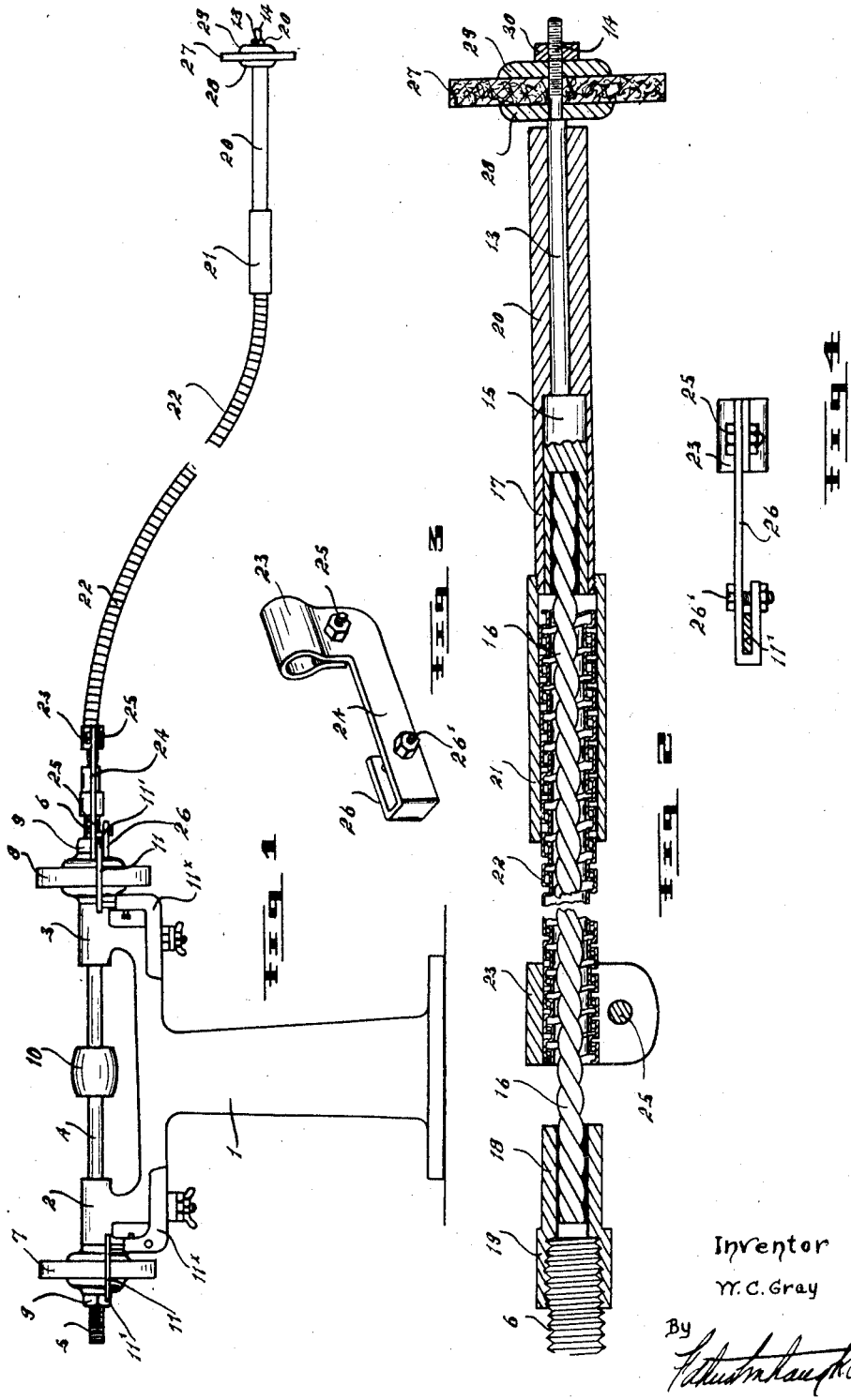
Inventor
W. C. Gray Patented Nov. 5, 1929

1,734,427

UNITED STATES PATENT OFFICE

WALLACE C. GRAY, OF ASSINIBOIA, SASKATCHEWAN, CANADA

FLEXIBLE DRIVE

Application filed January 3, 1927, Serial No. 158,715, and in Canada April 30, 1926.

The invention relates to improvements in flexible drives and an object of the invention is to provide a flexible drive for operating an emery or carborundum stone and particularly adapted for use with emery stands as customarily found in garages and repair shops.

A further object is to construct the device so that it can be readily attached to the driving shaft of an emery stand without requiring to alter the same.

With the above more important and other minor objects in view which will become more apparent as the description proceeds, the invention consists essentially in the arrangement and construction of parts hereinafter more particularly described, reference being had to the accompanying drawing, in which:—

Fig. 1 is a side view of an emery stand and showing my device attached thereto.

Fig. 2 is an enlarged detailed longitudinal sectional view through the appliance.

Fig. 3 is a perspective view of the supporting arm employed.

Fig. 4 is a vertical sectional view through the inturned end of the tool rest and showing the arm attached thereto.

In the drawing like characters of reference indicate corresponding parts in the several figures.

The emery stand which is of the conventional type presenting the customary standard 1, the base of which is suitably bolted to the floor, and the standard carries two aligned bearings 2 and 3 which support the armor spindle or driving shaft 4 which has the ends thereof oppositely screw threaded as indicated at 5 and 6. The customary emery stones 7 and 8 are mounted on the screw threaded ends of the shaft and held there in the ordinary manner by nuts 9. A driving pulley 10 is provided for rotating the shaft, a belt being applied thereon.

The customary tool rest 11 is also part of the machine equipment, this tool rest presenting an inturned portion 11' at the outer side of the wheel and being adjustably carried by the tool rest support 11ˣ.

The device which I provide is designed so that it can be readily screwed to the driving shaft 4 and attached to the tool rest. A spindle 13 is supplied, this having one end reduced and screw threaded as indicated at 14, and the other end enlarged to provide a cylindrical head 15. The head is cored out and in it I place one end of the metallic cable 16, the cable being permanently secured to the head as by soldering as indicated at 17. To the other end of the cable I secure permanently, as by soldering, a sleeve 18 and the sleeve terminates in a nut like head 19 interiorly screw threaded to receive the screw threaded end 6 of the arbor 4.

A bearing sleeve 20 rotatably receives the spindle 13 and the head 15 and to the inner end of the sleeve I secure a short tube 21 within which one end of a flexible metallic casing 22 passes and to which it is suitably secured. The other end of the flexible casing, which it will be observed, terminates adjacent the sleeve 18 is received within a bearing sleeve 23 located at the end of an arm 24. The bearing sleeve is a split one and is provided with a tightening bolt 25, so that it can be securely fastened to the inner end of the casing 22. The arm 24 is supplied also with a hook or catch 26 which is adapted to receive the inturned end 11' of the tool rest. A tightening bolt 26' is supplied for effectively holding the arm 24 in place on the tool rest. On the reduced end 14 of the spindle I locate an emery or carborundum wheel 27 which is held in place by discs 28 and 29 and a fastening nut 30.

When it is desired to use this device on the customary emery stand, one simply catches and jams the hooked end of the arm 24 on the inturned end 11' of the tool rest and screws the nut 19 on the end 6 of the shaft 4. When the shaft 4 is rotated in the ordinary manner the stone 27 is driven and can be used for doing a variety of work such as occurs in small machine shops and garages. The cable and casing thereof can be of any convenient length so as to give the device considerable range.

I am aware that flexible driving shafts have been used, but do not know of any device specifically constructed for quickly attaching to the customary emery stand, and which can be manufactured at comparatively small cost so that it is available for the small shops.

Obviously the device could be with equal facility attached to either end of the emery stand. When the device is in use, the flexible casing is held in place by hand, the bearing sleeve 23 acting as a support for the cable. At this time the casing pipe 21 and bearing sleeve 20 do not rotate as the cable rotating therewithin drives the spindle 13 and consequently the stone 27.

What I claim as my invention is:—

1. The combination with the driving shaft and the tool rest of an emery stand, said tool rest presenting an inturned end extending towards the shaft, of a supporting arm positioned parallel to the shaft and having one end hooked to receive the inturned end of the tool rest and the other end provided with a bearing sleeve spaced from the end of the shaft and axially aligned therewith, means for clamping the hooked end of the arm to the tool rest, a flexible metallic casing passing through the bearing sleeve and firmly held thereto and a driving cable passing through the flexible casing and detachably fastened to the end of the shaft.

2. The combination with the driving shaft and the tool rest of an emery stand, said tool rest presenting an inturned end extending towards the shaft, of a supporting arm positioned parallel to the shaft and having one end hooked to receive the inturned end of the tool rest and the other end provided with a split bearing sleeve spaced from the end of the shaft and axially aligned therewith, a fastening bolt for clamping the hook to the arm, a flexible casing passing into the sleeve, a fastening bolt for clamping the sleeve to the casing and a metallic cable passing through the casing and detachably fastened to the shaft to rotate therewith.

Signed at Assiniboia, Sask., this 20th day of September, 1926.

WALLACE C. GRAY.